United States Patent Office 3,437,315
Patented Apr. 8, 1969

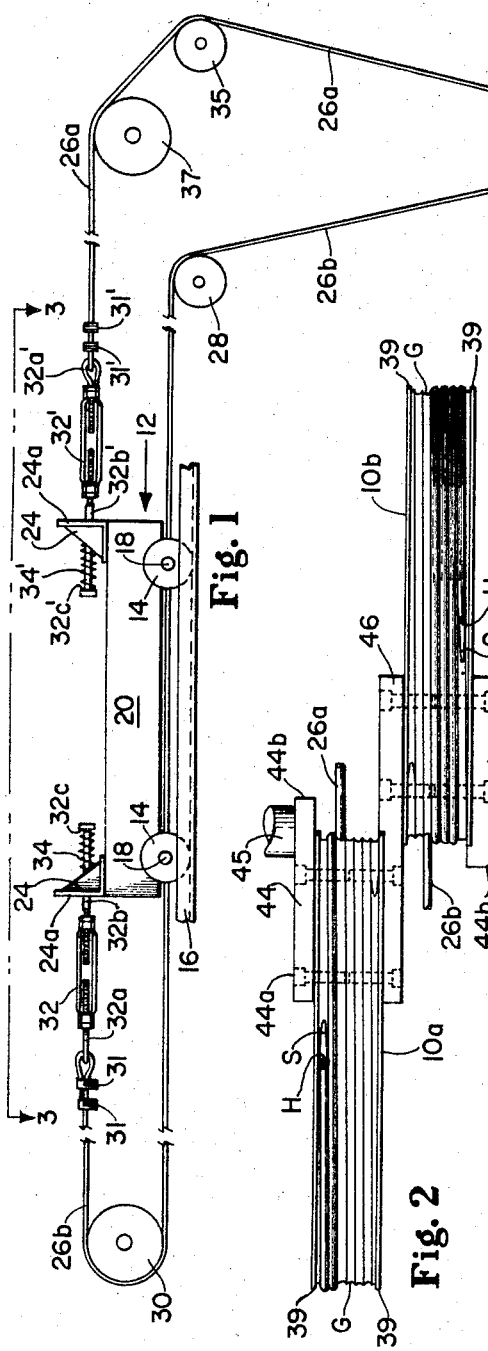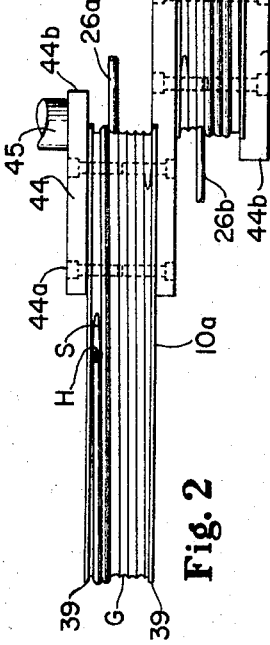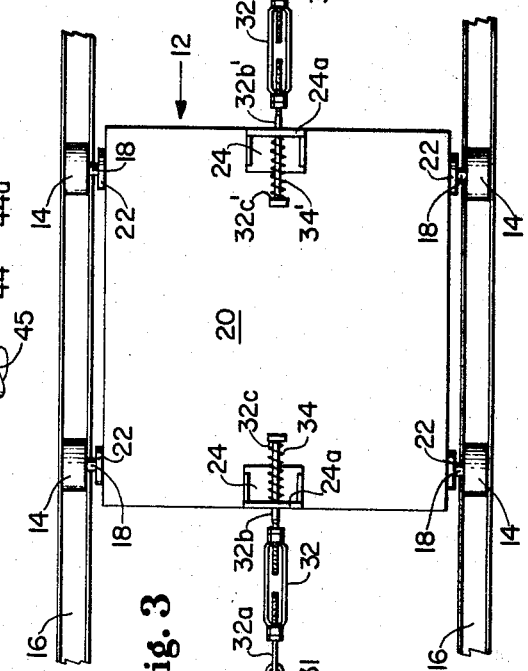

3,437,315
INDEXING MECHANISM
Harrison H. McDonald, Jr., Houston, Tex., assignor to The Procter & Gamble Company, Cincinnati, Ohio, a corporation of Ohio
Filed Dec. 20, 1966, Ser. No. 603,353
Int. Cl. B66d 1/26; B66c 21/00
U.S. Cl. 254—184                                    19 Claims

ABSTRACT OF THE DISCLOSURE

An indexing drive for moving a carrier between spaced positions and permitting accurate alignment of the carrier at such positions without critical controls, said mechanism comprising a pair of eccentrically mounted similarly sized and configured indexing drums having pitch circumferences equal to the spacing between such positions. The drums are each wound with a length of cable and are adapted to simultaneously rotate whereby to wind and unwind the respective cables at the same rate. The cables are mounted at opposite ends of the carrier and effect displacement thereof between stations as a result of the winding-unwinding action of the cables on the drums.

---

This invention relates to an indexing mechanism and more particularly to an indexing mechanism for transporting a carrier between and aligning it with spaced stacking positions associated with a unit load forming apparatus.

In connection with load forming apparatus such as described in U.S. Letters Patent 2,716,497 (issued Aug. 30, 1955 to Wahl et al.) gearhead motors are used to drive the carrier or trolley from one position to another. In order to achieve uniformity in the stopping point of indexing movements, limit switches are positioned along the path of carrier travel to slow down, cut off power and apply a brake to the motor at particular locations in advance of the position to which the carriage is traveling. However, it is difficult, if not impossible, to adjust the controls to assure proper alignment of the carrier at each station on a repetitive basis and when varying weights (and therefore momentum) of the loads being transported by the carrier are encountered. Moreover, even if the load weights do not vary, the coefficients of friction in the brake mechanism of the gear motor varies with ambient temperature changes to some extent, thereby causing variation in the distance traveled by the carrier even when a constant force is applied to the brake components.

It is an object of the present invention to obviate the above problems.

Another object of the present invention is to provide an indexing mechanism which will control the movement of a carrier between spaced locations and accurately align the carrier at each location without critical adjustment, regardless of variations in the load being transported by the carrier, on a repetitive basis.

A further object of the present invention is to provide a rugged, substantially maintenance-free indexing drive to control the movement of a carrier between adjacent stations of a unit load forming machine and accurately align the carrier with each, the device being adapted to produce any desired velocity profile by appropriately designing the exterior configuration of a pair of matched indexing rolls and also being adapted for use in connection with any other type of equipment wherein repetitive, intermittent, reciprocal, accurate movement of an object is required over a predetermined path between two or more specific spaced locations.

Briefly stated, in accordance with one aspect of this invention there is provided an indexing drum having an external support surface about which a flexible tension member is adapted to be helically wrapped. The drum is rotatably mounted on an axis which is parallel to and spaced outwardly from the external surface by a distance equal to approximately one-half of the thickness of the tension member.

While the specification concludes with claims particularly pointing out and distinctly claiming the subject matter which is regarded as forming the present invention, it is believed that the invention will be better understood from the following description taken in connection with the accompanying drawing, in which:

FIGURE 1 is a fragmentary elevational view of an indexing drive mechanism of the present invention, including a carrier adapted to be moved along a linear path, omitting obvious structural details for clarity;

FIGURE 2 is a fragmentary plan view of the indexing drive of FIGURE 1 as seen from line 2—2 thereof;

FIGURE 3 is a fragmentary plan view of the carrier of FIGURE 1 as seen from line 3—3 thereof;

Figure 4:
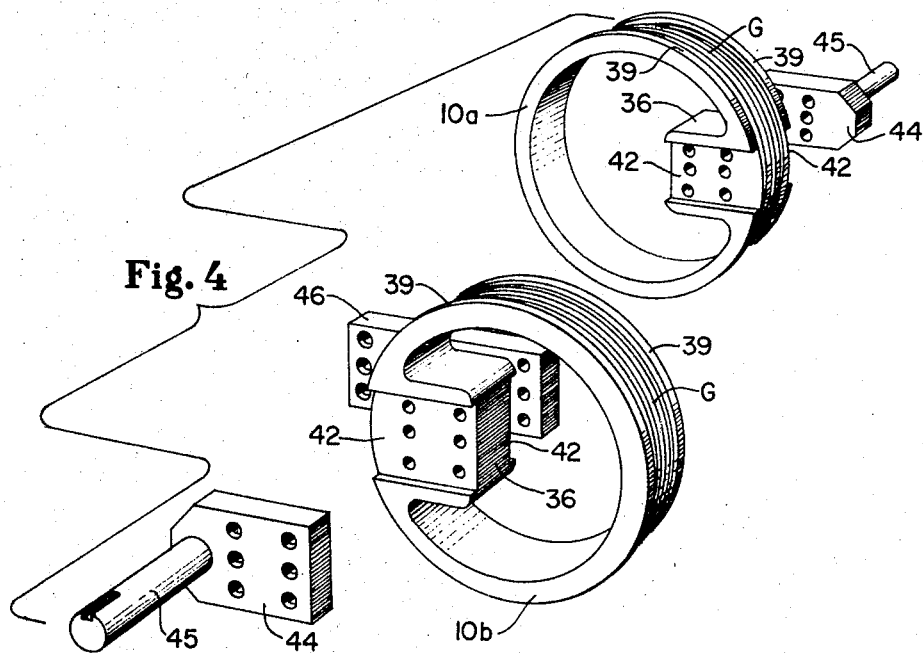
FIGURE 4 is a perspective explosion view of the indexing drum assembly of FIGURES 1 and 2, omitting screws for simplicity.

As shown in FIGURE 1, the indexing mechanism includes an indexing drive 10 and associated cables and connections linking the same with the object to be transported. The object illustrated is a carrier 12 mounted on wheels 14 received between upright flanges of a pair of generally U-shaped channel guide members 16 which are parallel and at the same elevation and thereby adapted to guide the carrier 12 along a horizontal linear path of the desired length. The carrier, for example, can serve the same purpose as the trolley of the above-cited Wahl et al. Patent, i.e., adapted to support and carry a suction head from station to station on a load forming machine. With such an arrangement a layer of containers can be assembled at a station located centrally of the length of the channel guide members 16 and transported intact in either direction to an adjacent station along the path defined by the members 16, at which station the layer is deposited on a pallet (or on top of layers previously deposited on a pallet at that station) so as to simplify the material handling problems in warehouses and the like. The suction head is not illustrated in the drawings since the same plays no part in the present invention; it will be understood, however, that there is a need for the carrier 12 to intermittently be accurately indexed between adjacent, equally spaced stations or positions lying along a path.

The carrier 12 may be constructed of any suitably rigid material such as metal or wood and can be shaped in many different ways. For the sake of simplicity carrier body 20 is shown merely as a solid-faced rectangular parallelepiped in the present drawing. The wheels 14, which can be of metal or rubber-covered metal, for example, are freely rotatably mounted on axles 18 which in turn can be secured to the carrier body 20 by means of axle support brackets 22 (see FIGURE 3) rigidly mounted at the sides of the carrier body 20 to thereby support the body 20 on the axles 18 in association with the wheels 14. To the top surface of the carrier body 20 in the center at each end is attached a gusset-reinforced bracket 24 having a vertical wall 24a which is substantially perpendicular to the linear path to be followed by the carrier 12 along channel guide members 16. The brackets 24 are oppositely disposed and for greatest strength can be of welded steel construction. An aperture (not shown) extends through each wall 24a at right angles thereto, said apertures being in general alignment and substantially centered on each wall. The materials and specific construction of the carrier 12 are not critical matters and can be varied as desired for specific applications.

The indexing drive 10 comprises a pair of indexing drums 10a and 10b having the same peripheral configuration and size and mounted for rotation along a common axis. A flexible tension member which can, for example, be a cable, rope, wire rope or the like, extends from each end of the carrier 12 to an indexing drum. As shown, wire rope 26a is helically wound around drum 10a and, similarly a flexible tension member, wire rope 26b is helically wound about indexing drum 10b. Wire rope 26b passes over and around freely rotatable idler pulley 28, extending substantially centrally along the linear path of travel of the carrier 12 along a line below the lower surface of carrier body 20 and around idler pulley 30 to a turnbuckle 32 located adjacent the left end of carrier 12 as shown in FIGURE 1.

The wire rope 26b is fastened about a thimble passing through the end loop of standard turnbuckle adjusting screw member 32a by clamps 31. The opposite adjusting screw member 32b of turnbuckle 32 comprises a rod one end of which is threaded, the central portion being sized to freely telescope through the aperture in wall 24a of the adjacent bracket 24 and the other end of which is of increased diameter to form a shoulder 32c. A compression spring 34 is telecoped over the central portion of the member 32b, which is then in turn telescoped through the above-mentioned aperture in bracket wall 24a and threadedly engaged with the balance of the turnbuckle 32. One end of spring 34 is adapted to engage shoulder 32c and the other end is adapted to press against the inner surface of bracket wall 24a, whereby in use the member 32b is biased inwardly of said carrier 12 to pull the wire rope 26b taut.

Wire rope 26a passes over and around freely rotatable idler pulleys 35 and 37 to the same type of spring-biased turnbuckle arrangement described previously, similar reference numerals with primes appended thereto signifying similar structures.

As shown in the drawing and in view of the above description, it will be understood that as the indexing drive 10 is rotated one of the wire ropes (26a or 26b) is adapted to be payed-off, i.e., unwound, from the drum on which it is wound while the other is being wound on its respective drum. Thus, the carrier 12 is moved from one position to another by reducing the length of one tension member along the path of carrier 12 travel, while simultaneously increasing the lentgh of the other tersion member along such path, the rate and extent of such reduction and increase being substantially identical. Each of the rolls 10a and 10b has a periphery such that one complete turn of the wire rope thereon has a length equal to the spacing between adjacent stations along the linear path to be followed by the carrier 12. The indexing drive 10 is oriented in the position shown in FIGURE 1, herein called the 0° position, at the time the carrier is aligned directly with each station. This, if the indexing drive 10 is at 0° position, with the carrier 12 at the central assembly station, a 360° clockwise rotation of the indexing drive 10 moves the carrier 12 directly into alignment with the station to the right of the central station, as viewed in FIGURE 1. This action and the manner of achieving a satisfactory velocity profile for the indexing movement of the carriage 12 will be more clearly understood from the following description.

Referring to FIGURES 1, 2 and 4, the indexing drums 10a and 10b are substantially identical in structure and size and in the particular embodiment shown are provided with circular peripheries. Each drum is constructed from a casting which is substantially cylindrical in form and has a re-entrant flange 36 (see FIGURE 4) projecting from its interior sidewall. The peripheries of the castings are machined as shown most clearly in FIGURE 2 wherein a pair of side shoulders 39 are provided on each roll by recessing the central peripheral portions thereof. A helical groove G is cut in the center peripheral portion of each drum, the groove G comprising a number of turns equal to the number of stations lying along the linear path followed by the carriage plus about one and three-quarter or more additional turns to assure that the secured end of the cable is not pulled loose, as will be understood from subsequent description. Thus, where the subject invention is used as the indexing means for a unit load forming device which has a central layer assembling station and a loading station on each side thereof along the linear path, the number of turns required in each of the helical grooves G is at least about four and three-quarters. In connection with wire rope having a diameter of 3/8" it has been found satisfactory to make helical groove G arcuate in cross-section, using a radius of sidewall curvature of about .205", the helix having a 7/16" pitch. The groove G should desirably be shallower than one-half of the diameter of the wire rope for best results and it has been found satisfactory in this connection to have the maximum depth of groove below the top surface of the groove G sidewalls equal to approximately 5/32" for use with a 3/8" wire rope.

The helix of groove G in each indexing drum should proceed in a direction determined by the relationship of the rotary movement of one drum to that of the other. If both drums are to be simultaneously rotated in different directions, the groove G on each drum must wind along the drum surface in the same direction; where, however, as in the present instance both drums are to be simultaneously rotated in the same direction, then the groove G on one drum must wind in a direction reverse that of the other. Thus, as viewed in the elevation of FIGURE 1, the groove of roll 10a winds in a clockwise direction while that of roll 10b winds counter-clockwise. Stated more generally for structures in which the drums cannot be compared in the same elevation, at any point of time in the indexing cycle the winding of the groove G of one drum must run opposite its direction of rotation while that of the other drum must be the same as its direction of rotation.

The start S of the groove G in each drum, i.e., the end of the groove on which the non-working portion of the flexible tension member is wrapped, should preferably be located about 1¾ or more complete turns of the groove G from the position thereon of the end of the working portion of the tension member when the same is fully unwound. From the 0° position of the indexing drive 10 shown in FIGURE 1, 1¾ turns in a clockwise direction on drum 10a and 1¾ turns in a counterclockwise direction on drum 10b determine that the start of each groove can begin at the top of each respective drum. The start can be made at either side of the drum but preferably in the illustrated embodiment is at the side further removed from the other drum, that at the upper side of roll 10a and the lower side of roll 10b in FIGURE 2. The groove G should be formed having at least the minimum number of turns mentioned above, i.e., 4¾ turns for a three station movement. The number of turns shown in the drawings are 5¾, which is sufficient for a four station indexing movement.

At a point H at the start S of the groove where the same is full width, each drum 10a and 10b is radially drilled through the center of the groove G to provide a hole having a diameter approximately equal to the width of the groove G and through which an end of the wire rops to be wound thereon can be telescoped. The edge of the hole on the side thereof over which the wire rope will be bent when it is laid in the groove G can be rounded to avoid damage to the wire rope when it is pulled taut in use. The end of the wire rope which projects through the hole is bent at a right angle with the axis of the hole so as to lie on the surface of the hollow roll interior and a clamp 38, tightened by machine screws 40, secures the end of the wire rope against the interior surface of the drum.

Each of the drums 10a and 10b is machined on each side in alignment with re-entrant portions 36 thereby providing radially-extending, identically-sized recesses 42 to facilitate the rigid attachment of one drum to the other and to enable the unit to be mounted on shaft means. A shaft support plate 44 having a width identical to the width of a recess 42 is attached to each of the indexing drums in the recess 42 adjacent the start S of the groove G on the respective drums 10a and 10b. The support plates 44 are drilled and counterbored for socket head cap screws 44a and aligned holes are drilled and tapped in the corresponding recesses 42. As shown, six socket head cap screws 44a are employed to hold each of the support plates 44 rigidly to the respective drums.

One end 44b of each support plate 44 projects beyond the periphery of the drum to which it is attached and a shaft 45 is affixed to the plate 44, projecting outwardly at right angles with the outer face thereof. This can be accomplished by boring a hole in the shaft support plate 44, telescoping the shaft 45 therein and welding the same in place. As shown in FIGURES 1 and 4, one of the shafts 45 is provided with a keyway which is employed in non-rotatably securing driving means such as a sprocket to the shaft 45 whereby rotary motion can be transmitted to the indexing drive 10. The construction of each shaft support assembly, i.e., plate 44 and shaft 45, and the location thereof in the recess 42 is such that each of the shafts 45 extends parallel to the external surface on which the wire rope is supported and passes through the axis of the wire rope loops wound on the drums. In the present example and employing a ⅜" diameter wire rope, the axis of each shaft 45 will be parallel to a transverse line interconnecting the troughs—the central low points—of each loop of the groove G on the roll to which it is attached (the trough comprising the external support surface for the flexible tension member on a grooved drum) and will be offset outwardly therefrom by a distance of 3/16". Defining the average circumference of a loop of the tension member on a drum to be the pitch circumference of the drum, the axis of shaft 45 extends through the pitch circumference.

A connecting plate 46 is used to rigidly attach the indexing drums to one another with the pitch circumferences thereof tangent with one another along the axes of shafts 45. One end of the plate 46 is secured within the recess 42 at the terminal side of the groove of drum 10a and the other side is similarly secured in the recess 42 on the terminal side of the groove of drum 10b. Such attachment may be accomplished in the same manner as shaft supports 44 are attached to the rolls. Thus, it will be noted that the indexing drums 10a and 10b and their respective shaft support assemblies will be joined with the re-entrant portions 36 extending at an angle of 180° with one another and with the shaft 45 axes in direct alignment.

The indexing drive 10, the idler pulleys 28, 30, 35 and 37 and the channel guide members 16 are mounted in suitable framework in a manner which will be apparent to one of ordinary skill in the art; in this connection, however, it is desirable for the idler pulley 28 to be located in such a position that the point of tangency of the wire rope 26b thereon is located vertically over the geometric center of the drum 10b as viewed in FIGURE 1. Similarly, the point of tangency of the wire rope 26a on the idler pulley 35 should overlie the geometric center of drum 10b in the same figure. The axes of idler pulleys 28 and 35 should be at the same elevation over the axes of shafts 45 and each such pulley should preferably lie in the same vertical plane in line with the lengthwise-extending center of connecting plate 46. This positioning will result in similar oscillating movements of the respective wire ropes in operation, which will minimize deviation in the rate of wire rope being payed-off and wound-on the respective rolls during indexing operations.

The indexing drive is rotatably mounted on the above-mentioned framework on bearings (not shown) and rotary motion preferably imparted thereto by means of a sprocket and chain arrangement through an appropriately sized gearhead electric motor. None of the driving components are shown or herein described since the same are mere matters of selection based upon the requirements of the application of the present invention and comprise details with which those skilled in the art are well-versed.

The length of the wire rope 26a is equal to the length of the wire rope path between the indexing drive 10 and the carrier 12 when it is in an extreme right hand station, as viewed in FIGURE 1, plus a length equal to at least one and three-quarter turns on the indexing drum plus a length equal to the distance between adjacent stations multiplied by the number of stations. Thus, where the path of wire rope 26a has a length of 12 feet between the indexing drive assembly 10 and the turnbuckle 32' and the carrier 12 is to serve three positions spaced seven feet apart, the required length would be 12 feet, plus 1¾ x 7 feet, plus 3 x 7 feet, to give a total length of 45.25 feet. To this calculated length is added the length required to fasten the wire rope to the roll 10a and to the turnbuckle 32'. The length of wire rope 26b is similarly calculated, substituting the length of the wire rope path between the indexing drive 10 and the carrier 12 when it is at the extreme left hand station, as viewed in FIGURE 1, for the corresponding term of the previous calculation. In any event, a wire rope 26a of the correct length is taken and one end is telescoped through the radial hole at point H at the start of the groove of the indexing drum 10a, wrapped around the drum 10a, a few turns, threaded along the path described previously and attached to the turnbuckle 32' on the right side of the carrier 12. Then the carrier 12 is moved to the left in FIGURE 1, taking up the slack in wire rope 26a. Wire rope 26b is then similarly clamped to the indexing drum 10b, wrapped around that drum a number of times dependent on the position of the carrier 12, threaded through the path previously described and attached to turnbuckle 32. Next, the indexing drive 10 is placed in the 0° position shown in FIGURE 1 wherein both wire ropes converge to a point in general alignment with the axes of the shafts 45, and turnbuckles 32 and 32' are adjusted. Turnbuckle adjustment places the carrier 12 in direct alignment with one of the loading positions and assures that the springs 34 and 34' are placed under compression whereby each of the wire ropes 26a and 26b can be maintained taut.

Following the above set-up, when it is desired to move the carriage from one position to an adjacent position the indexing drive 10 is appropriately rotated one revolution to thereby pay-off wire rope from one indexing drum and wind it on the other at the same rate, the length involved being equivalent to the distance between adjacent stations. The starting and stopping of the motor causing rotation of the indexing drive 10 can be regulated by controls such as described in the aforementioned Wahl et al. patent whereby the motor is stopped following approximately one revolution of indexing drive 10. If it is desired to move the carrier 12 of FIGURE 1 to a position immediately to the left of its present location, the indexing drive 10 would turn one revolution in a counter-clockwise direction thereby causing wire rope 26b to be wound upon indexing drum 10b and simultaneously causing wire rope 26a to be payed-off indexing drum 10a at the same rate. Since one turn of the wire rope on the indexing drums 10a and 10b is equal to the distance between adjacent loading stations, following the completion of the single revolution the carrier 12 will have moved the exact distance between the said adjacent stations.

The controls which regulate the single revolution movement of the indexing drive do not have to be precise since the pay-off and winding of the wire rope, and thereby the displacement of the carrier 12, is very low during both the initial and final portions of the rotary movement.

Figure 5:
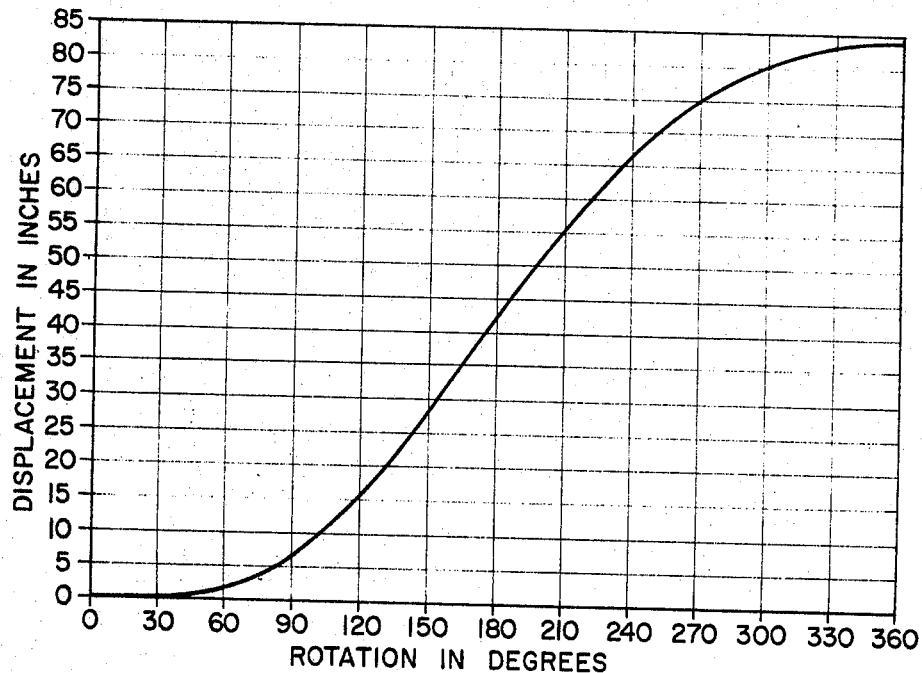
FIGURE 5 is a graph illustrating the linear displacement of the carrier of FIGURES 1 and 3 as the indexing drive is rotated one full turn.

This is clearly shown in FIGURE 5 in which the degree of rotary movement of the indexing drive 10 is shown as the abscissa and the displacement of the carrier 12 is the ordinate. The displacement is graphed in inches and is calculated using the following exemplary parameters in the structure described above:

| | |
|---|---|
| Wire rope diameter | ⅜″ |
| Pitch diameter of indexing drums (the average diameter of a loop of wire rope around the drums) | 26¾″ |
| Vertical distance between the axis of the idler pulleys 28 and 35 and the common axis of shafts 45 on indexing drive 10 | 78¼″ |
| Horizontal distance between the axes of idler pulleys 28 and 35 | 26⅜″ |
| Idler pulley pitch diameters | 5¼″ |

Mathematical computations for the length of wire rope wound thereon during the first 60° and the last 60° of counterclockwise rotary movement of drum 10b give the following values of displacement of the carrier 12 (to the nearest tenth of an inch);

| Rotation in degrees | Displacement in inches | Rotation in degrees | Displacement in inches |
|---|---|---|---|
| 0 | 0 | 300 | 80.7 |
| 5 | .0 | 305 | 81.3 |
| 10 | .0 | 310 | 81.9 |
| 15 | .0 | 315 | 82.3 |
| 20 | .0 | 320 | 82.7 |
| 25 | .1 | 325 | 83.1 |
| 30 | .1 | 330 | 83.4 |
| 35 | .2 | 335 | 83.6 |
| 40 | .4 | 340 | 83.7 |
| 45 | .6 | 345 | 83.8 |
| 50 | .8 | 350 | 83.9 |
| 55 | 1.2 | 355 | 84.0 |
| 60 | 1.6 | 360 | 84.0 |

From the above it will be seen that if the rotation is stopped anywhere between about 335° and 400° (i.e., 40° further than one complete turn) the maximum displacement of the carriage 12 from the exact desired location of the carrier at a station is about 0.4″. For the purpose of alignment with loading stations on a load-forming machine, for example, error in displacement of up to about ½″ to either side of a station is permissible.

As pointed out above the ends of the wire ropes 26a and 26b are spring-loaded by compression springs 34′ and 34. This maintains tension on each of the tension members and permits the absorption of inertia force without unduly stressing them. The springs also compensate for any discrepancy which might be present in the length of the wire rope being payed-off one indexing drum as contrasted with that being wound-on another at any point of time in the indexing cycle. Such discrepancy will exist in view of the fact that commercial manufacturing tolerances for the grooves, drum diameters, shaft locations and the like permit some degree of difference in the drums. Also, it is believed that as each of the wire ropes oscillates back and forth during the winding operation there is a different amount of wrap on one drum as compared with that on another and, consequently, the instantaneous rate of wire rope removal from one drum will differ slightly from the rate of wire rope winding on the other.

It will be realized that this invention can be applied to drums of varying configuration and they do not have to be of a circular shape. For example, the surface on which the wire ropes are wound can be made elliptical to the degree desired so as to result in different acceleration and velocity characteristics. Such adaptations are merely matters of straight-forward engineering and mathematical computations in view of the present disclosure and are therefore not illustrated or described in greater detail herein.

It will also be realized that a single drum system can be employed for indexing the carrier 12 provided that the carrier is biased for movement in a direction opposite that in which the wire rope from the drum is moved when it is wound thereon. This maintains the wire rope under tension whereby to permit the single wire rope to move the carrier 12 in either direction. Such biasing can be applied, for example, by connecting a cable to the end of the carrier 12 opposite that to which the wire rope from the drum is attached and extending the cable around an idler pulley, such as pulley 30, to a weight. The cable is attached to and suspends the weight in mid-air, gravity acting on the weight therefore constantly biasing the carrier for movement in the direction of the pulley.

While the subject invention has been described as employing two separate lengths of flexible tension member, it is also apparent that the same could be replaced by a single length. In this case the parts of the tension member wound at the start S end of each groove would be directly connected by an intervening piece of the tension member extending between the drums.

Many modifications of the above invention may be used and it is not intended to hereby limit it to the particular embodiments shown or described. The terms used in describing the invention are used in their descriptive sense and not as terms of limitation, it being intended that all equivalents thereof be included within the scope of the appended claims:

What is claimed is:

1. An indexing drum having an external support surface about which a flexible tension member can be helically wrapped, wherein the improvement comprises: said drum being mounted for rotation about an axis substantially parallel to and spaced outwardly from said surface by a distance equal to approximately one-half of the thickness of said flexible tension member.

2. An indexing mechanism which employs a flexible tension member for pulling an object to be transported, a rotatably mounted indexing drum, means to rotate said drum, a portion of said tension member being helically wrapped about an exterior support surface of the drum whereby slippage therebetween is substantially eliminated, wherein the improvement comprises: mounting said drum for rotation about an axis which approximately intersects the axis of said helically wrapped portion of said tension member and lies generally parallel to the helix formed thereby.

3. An indexing mechanism which employs a flexible tension member for pulling an object to be transported between stations which lie a predetermined distance from one another, a rotatably mounted indexing drum, means to rotate said drum, a portion of said tension member being helically wrapped about an exterior support surface of the drum whereby slippage therebetween is substantially eliminated, wherein the improvement comprises: constructing said drum so said support surface has a periphery such that one complete turn of said tension member thereon has a length equal to said predetermined distance and mounting said drum for rotation about an axis which approximately intersects the axis of said helically wrapped portion of said tension member and lies generally parallel to the helix formed thereby.

4. The indexing mechanism of claim 3 in which the flexible tension member is affixed to said object with a spring-biased connection adapted to maintain said tension member in taut condition.

5. An indexing mechanism for moving a carrier between a plurality of equally spaced positions and employing a flexible tension member attached to the carrier to control the movement and location of said carrier, a rotatably mounted indexing drum, means to rotate said drum, a portion of said flexible tension member being helically wrapped about an exterior support surface of the drum whereby slippage therebetween is substantially eliminated, wherein the improvement comprises: mounting said drum for rotation about an axis which substantially intersects the pitch circumference of said drum, said pitch circumference having a length equal to the spacing between said positions.

6. The indexing mechanism of claim 5 in which said drum is cylindrical and helically grooved.

7. An indexing drum assembly comprising a pair of substantially identical externally configured and sized drums, said drums each having an external surface adapted to receive windings of a flexible tension member thereabout, said drums being eccentrically mounted on a common axis of rotation said axis of rotation being parallel to each of said external surfaces and spaced outwardly therefrom a distance equal to approximately one-half of the thickness of said flexible tension member, said drums being rigidly attached to each other in laterally offset relation along said common axis and positioned so that one is radially offset 180° from the other around said axis.

8. The indexing drum assembly of claim 7 in which each said external surface comprises the trough of a helically extending groove adapted to receive said windings of said flexible tension member, said grooves being of similar size and pitch.

9. The indexing drum assembly of claim 8 in which the helical grooves are oppositely formed so that the winding of the working portion of said member on one drum will proceed in a counter-clockwise direction as viewed in elevation and the winding of the working portion of said member on the other drum will proceed in a clockwise direction, as viewed in the same elevation.

10. The indexing drum assembly of claim 9, in which the external surfaces of each of said drums is substantially circular in cross section.

11. An indexing drive comprising a pair of similarly sized and configured indexing drums each of which has a length of a flexible tension member wrapped helically therearound with one end leading to an object to be transported, said drums each being mounted for eccentric rotation about an axis which approximately intersects the pitch circumference of the drum, means to simultaneously rotate each drum at identical speeds, the direction of wrapping on one drum of said flexible tension member, as viewed from the end thereof which leads to said object, being the same as the direction of rotation of said one drum at a given point in the indexing cycle, said directions of wrapping and rotation of the other drum at such given point being opposed to one another, said drums being radially oriented and positioned so that at any point in the simultaneous rotary movement of the drums the rate of unwinding of the flexible tension member from one drum is substantially equal to the rate of winding thereof on the other drum.

12. The indexing drive of claim 11 in which the axes of the drums are coincident.

13. The indexing drive of claim 12 in which said drums are attached in laterally offset relation along the coincident axes of rotation, said drums being oppositely disposed and approximately 180° out of phase.

14. The indexing drive of claim 13 in which each drum is substantially cylindrical.

15. An indexing mechanism for moving a carrier between a plurality of spaced stations and employing a flexible tension member mounted at each end of the carrier to control the movement and location thereof, said tension member being associated with an indexing drive adapted to impart intermittent linear movement to said carrier, wherein the improvement comprises: the employment of a pair of substantially identical eccentrically mounted rotatable drums as the indexing drive, said drums each being provided with reversible means to simultaneously rotate the drums at identical speeds while maintaining a constant relationship between the respective directions of rotation; the flexible tension member attached to one end of said carrier being wrapped around an exterior support surface of one drum and that attached to the other end of said carrier being wrapped around the exterior support surface of the other drum; the direction of wrapping on one drum of said tension member, as viewed from the end thereof attached to said carrier, being opposite the direction of rotation of the said one drum at a given point in the indexing cycle while at that same point, when similarly viewed, the direction of wrapping of said tension member on the other drum matches its direction of rotation; the aforesaid relationships being reversed upon reversal of the direction of rotation of said drums; said drums being radially oriented and positioned so that during the simultaneous rotation thereof the rate of unwinding of the flexible tension member from one drum is substantially equal to the rate of winding thereof on the other drum.

16. The indexing mechanism of claim 15 in which the axis of rotation of each drum is substantially parallel to its exterior support surface and spaced outwardly therefrom a distance of about one-half of the thickness of said flexible tension member.

17. The indexing mechanism of claim 16 in which the axes of said drums are coincident and in which said drums are attached in laterally offset relation along the coincident axes of rotation, said drums being oppositely disposed and approximately 180° out of phase.

18. The indexing mechanism of claim 17 in which the said drums are each substantially cylindrical.

19. The indexing mechanism of claim 15 in which the flexible tension member is mounted at each end of the carrier by a spring-biased connection adapted to maintain said tension member in taut condition and to compensate for minor variations in the respective said rates of winding and unwinding.

References Cited

FOREIGN PATENTS 972,868   10/1959   Germany.
885,350   12/1961   Great Britain.

EVON C. BLUNK, *Primary Examiner.*

HARVEY C. HORNSBY, *Assistant Examiner.*

U.S. Cl. X.R.

212—76